(12) United States Patent
Rozhnova et al.

(10) Patent No.: US 10,397,809 B2
(45) Date of Patent: Aug. 27, 2019

(54) MOBILITY LOSS DETECTION AND RECOVERY

(71) Applicant: CISCO TECHNOLOGY, INC., San Jose, CA (US)

(72) Inventors: Natalya Rozhnova, Paris (FR); Giovanna Carofiglio, Paris (FR); Michele Papalini, Paris (FR); Luca Muscariello, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 107 days.

(21) Appl. No.: 15/479,060

(22) Filed: Apr. 4, 2017

(65) Prior Publication Data

US 2017/0332258 A1 Nov. 16, 2017

(30) Foreign Application Priority Data

May 13, 2016 (FR) ...................................... 16 54326

(51) Int. Cl.
| | | |
|---|---|---|
| *H04W 24/04* | (2009.01) | |
| *H04W 48/18* | (2009.01) | |
| *H04W 48/16* | (2009.01) | |
| *H04W 8/26* | (2009.01) | |
| *H04W 8/02* | (2009.01) | |
| *H04W 76/15* | (2018.01) | |

(52) U.S. Cl.
CPC ............. *H04W 24/04* (2013.01); *H04W 8/02* (2013.01); *H04W 8/26* (2013.01); *H04W 48/16* (2013.01); *H04W 48/18* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 9,379,979 B2* | 6/2016 | Solis | H04L 45/7453 |
| 9,553,812 B2* | 1/2017 | Mahadevan | H04L 47/2466 |
| 9,590,887 B2* | 3/2017 | Mahadevan | H04L 45/026 |
| 9,729,616 B2* | 8/2017 | Mahadevan | H04L 65/403 |
| 9,729,662 B2* | 8/2017 | Mahadevan | H04L 67/2842 |
| 9,832,116 B2* | 11/2017 | Wood | H04L 45/54 |
| 10,075,401 B2* | 9/2018 | Mosko | H04L 67/2833 |
| 2013/0016695 A1* | 1/2013 | Ravindran | H04L 67/327 370/331 |

(Continued)

OTHER PUBLICATIONS

Herberg, U., et al., "Depth-First Forwarding (DFF) in Unreliable Networks," Internet Engineering Task Force RFC 6971, Jun. 2013; 41 pages.

*Primary Examiner* — Andrew C Oh
(74) *Attorney, Agent, or Firm* — Patterson + Sheridan, LLP (57) ABSTRACT

Particular embodiments described herein provide for a system, method, and apparatus that can be configured to determine that a first network element is no longer connected to a second network element, where interests had been sent to the second network element and are still pending. Each of the pending interest can be associated with a pending interval timer and the pending interests can be forwarded to a third network element before the expiration of the pending interval timer associated with each of the pending interests. In an example, the pending interest is part of an information centric networking protocol.

20 Claims, 6 Drawing Sheets

(56) References Cited

U.S. PATENT DOCUMENTS

| | | | |
|---|---|---|---|
| 2013/0039249 A1* | 2/2013 | Ravindran | H04L 67/2842 370/312 |
| 2015/0120924 A1* | 4/2015 | Scott | H04L 69/22 709/225 |
| 2015/0281083 A1* | 10/2015 | Kim | H04L 45/7457 370/235 |
| 2015/0341373 A1* | 11/2015 | Solis | H04L 45/745 726/23 |
| 2016/0020887 A1* | 1/2016 | Gupta | H04L 1/1848 370/328 |
| 2016/0065685 A1* | 3/2016 | Kurihara | H04L 1/08 714/748 |
| 2016/0182368 A1* | 6/2016 | Azgin | H04L 45/306 370/331 |
| 2016/0366620 A1* | 12/2016 | Royon | H04L 67/10 |
| 2017/0005891 A1* | 1/2017 | Liu | H04L 43/0811 |
| 2017/0034055 A1* | 2/2017 | Ravindran | H04W 40/20 |
| 2017/0048346 A1* | 2/2017 | Ravindran | H04L 67/2842 |
| 2017/0070421 A1* | 3/2017 | Ye | H04L 45/245 |
| 2017/0093713 A1* | 3/2017 | Garcia-Luna-Aceves | H04L 45/50 |
| 2017/0230283 A1* | 8/2017 | Liu | H04L 45/72 |

* cited by examiner

MOBILITY LOSS DETECTION AND RECOVERY

CROSS-REFERENCE TO RELATED APPLICATION

This application claims the benefit of priority under 35 U.S.C. § 119(e) to FR Patent Application No. 1654326, entitled "MOBILITY LOSS DETECTION AND RECOVERY," filed in with the French Patent Office on May 13, 2016, which is hereby incorporated by reference in its entirety.

TECHNICAL FIELD

This disclosure relates in general to the field of communications and, more particularly, to mobility loss detection and recovery.

BACKGROUND

End users have more communications choices than ever before. A number of prominent technological trends are currently afoot (e.g., more computing devices, more online video services, more Internet video traffic), and these trends are changing the network delivery landscape. The Internet currently handles a majority of the communications and is a global system of interconnected computer networks that use a standard Internet Protocol suite (TCP/IP) to link several billion devices worldwide. Internet Protocol version 4 (IPv4) was the first publicly used version of the Internet Protocol (IP) but as use of the Internet continues to grow, a new system is needed. One proposed new system is information centric networking (ICN) which can allow for mobile networking. However, in mobile networking, when a node moves and the network is not converged to its new location yet, all packets destined to the mobile node will be sent to the old position and lost. Hence, there is a challenge in providing mobility loss detection and recovery.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

The following detailed description sets forth example embodiments of apparatuses, methods, and systems relating to a communication system for enabling resource monitoring. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
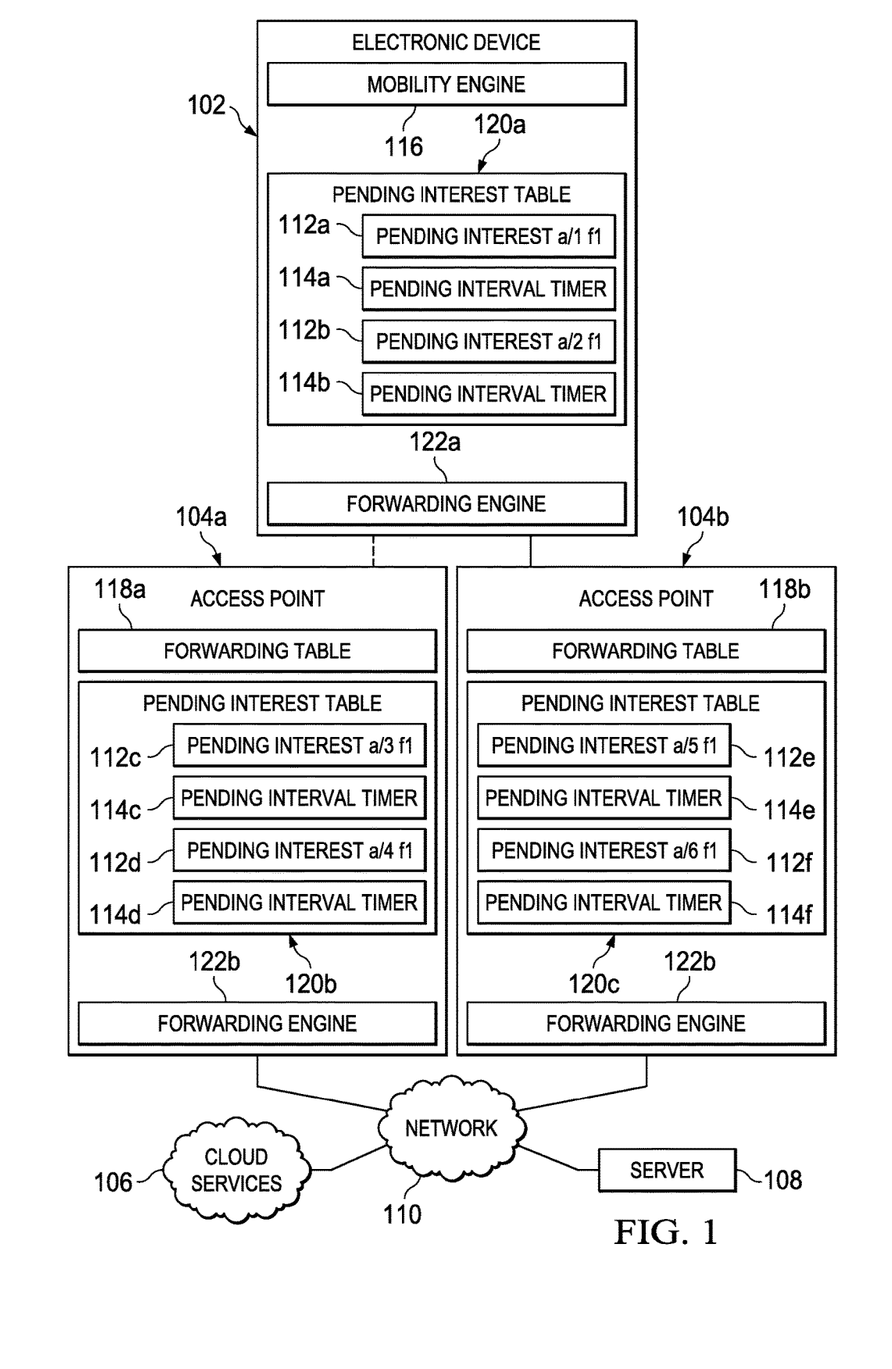
FIG. 1 is a simplified block diagram of a communication system in accordance with one embodiment of the present disclosure.

Turning to FIG. 1, FIG. 1 is a simplified block diagram of a communication system 100 for mobility loss detection and recovery. FIG. 1 includes electronic device 102, access points 104a and 104b, cloud services 106, and a server 108. Electronic device 102 can include a pending interest table 120a, a mobility engine 116 and a forwarding engine 122a. Pending interest table 120a can include one or more pending interests 112a and 112b and one or more associated pending interval timers 114a and 114b. Access point 104a can include a forwarding table 118a, a pending interest table 120b, and a forwarding engine 122b. Pending interest table 120b can include one or more pending interests 112c and 112d and one or more associated pending interval timers 114c and 114d. Pending interest 112c and 112d may or may not be associated with electronic device 102. For example, pending interest 112c may be associated with pending interest 112a or may be associated with another electronic device. Access point 104b can include a forwarding table 118b, a pending interest table 120c, and forwarding engine 122b. Pending interest table 120c can include one or more pending interests 112e and 112f and one or more associated pending interval timers 114e and 114f. Pending interest 112e and 112f may or may not be associated with electronic device 102. For example, pending interest 112e may be associated with pending interest 112*a* or may be associated with another electronic device. Access points 104*a* and 104*b* can be in communication with cloud services 106 and server 108 using network 110. In an example, electronic device 102 was in communication with access point 104*a* but is now in communication with access point 104*b*.

Communication system 100 can be configured to detect and recover from data losses due to device mobility (e.g., electronic device 102 moving its connection from access point 104*a* to access point 104*b*). On the backend, the system can recover the losses due to mobility and can differentiate between losses due to congestion or losses due to mobility of an electronic device (e.g., electronic device 102) as the electronic device connects to different access points (e.g., access points 104*a* and 104*b*). The system may also improve the behavior of the transport layer protocols that are generally not aware about the nature of loss and by default take everything for congestion. From a user's point of view, the download time as well as the observed quality of service may be improved because the network can perform the loss recovery before the expiration of a pending interval timer.

For purposes of illustrating certain example techniques of communication system 100, it is important to understand how typical communications may traverse the network. The following foundational information may be viewed as a basis from which the present disclosure may be properly explained.

The Internet is a global system of interconnected computer networks that use the standard Internet protocol suite (TCP/IP) to link several billion devices worldwide and consists of millions of private, public, academic, business, and government networks of local to global scope, linked by a broad array of electronic, wireless, and optical networking technologies. The Internet carries an extensive range of information resources and services, such as the inter-linked hypertext documents and applications of the World Wide Web (WWW), the infrastructure to support email, and peer-to-peer networks for file sharing and telephony. Internet Protocol version 4 (IPv4) was the first publicly used version of the Internet Protocol (IP) and currently routes most traffic on the Internet. However, due to the exponential increase in network traffic, especially mobile traffic, a more efficient system is needed Information centric networking (ICN) appears as a promising candidate technology by defining a general network substrate that overcomes the limitations of connection based communications and natively integrates faster in-network control. ICN proposes a different networking paradigm centering the communication around named data requested by the consumer in a pull based fashion. The end-to-end principle is totally revisited as the consumer is a unique known endpoint while every network router reached by requests from the consumer may serve the corresponding data from its local cache or take hop-by-hop forwarding decisions to route the request (also called 'Interest'). In network decisions are enabled by a soft state associated to pending requests and may help rate and congestion control management otherwise performed at the consumer side. Using the ICN architectural principle, the problem of fast detection and recovery of wireless mobility in the network can be addressed and can provide a level two (L2) agnostic solution that copes with almost any wireless medium irrespectively of its characteristics.

For example, ICN is based on the premise that the Internet is primarily used as an information distribution network and that a system (e.g., the future Internet) should be based on named data rather than numerically addressed hosts. The underlying principle is that a communication network should allow a user to focus on the data that is requested rather than having to reference a specific physical location where that data is to be retrieved. ICN comes with potential for a wide range of benefits such as content caching to reduce congestion and improve delivery speed, simpler configuration of network devices, and building security into the network at the data level. However, when a mobile node moves and the network is not converged to its new location yet, all packets destined to the mobile node will be sent to the old position and most likely lost.

A communication system for mobility loss detection and recovery, as outlined in FIG. 1, can resolve these issues (and others). Communication system 100 can be configured to detect and recover from data losses due to device mobility. In a specific example, two kinds of nodes can be identified, a consumer or user node that is asking for the content and a producer node that is offering the content. In a bidirectional system, each network element or node may be both a consumer node (or user node) and a producer node. For example, electronic device 102, access points 104*a* and 104*b*, cloud services 106, and server 108 may be a consumer node, a provider node, or both a consumer node and a provider node. Generally, two types of packets are defined in ICN, an interest packet that includes requests and a data packet that includes requested content. To get N data packets, a consumer or user node should send N interests or one for each data packet. When the consumer or user node moves or goes offline, all pending interests (e.g., pending interests 112*a* and 112*b*) that have not yet been satisfied will never be satisfied due to the symmetric routing property of ICN. On mobility events, no action is taken until an application/pending interval timer (e.g., pending interval timer 114) for the packet expires. All kinds of losses are typically detected due to the expiration of a timeout, which is set equal to the interest lifetime, typically in the order of seconds. This causes a retransmission of the expired packet and a congestion window decrease due to the misinterpretation of timeouts as congestion rather than mobility signals. The situation of producer node mobility, or when a producer node goes offline, is at first similar to the one of consumer or user node mobility, since it will also cause timeouts that affect the congestion control mechanism and lead to delays for retransmitting interests. In addition, since neither the consumer, user node, or the network will be able to detect the movement of the producer node, retransmission of the interest packets might be done on the same broken path with no producer node at the end, which will further degrade performance of the system.

When the consumer or user node detects its mobility, it will perform a lookup in its pending interest table (e.g., pending interest table 120*a*) to find all entries (e.g., pending interests 112*a* and 112*b*) that have been sent to the previous access point (e.g., access point 104*a*) or base station. When the consumer or user node changes its access point (e.g., moves from access point 104*a* to 104*b*), the consumer or user node can recognize the pending interest table entries that have been sent to the previous access point and are still pending. The pending interests will actually never be satisfied due to symmetric routing. In this case, if a new access point is available and the connection with the new access point is established, the found pending interests can be reforwarded without waiting for the expiration of the pending interval timer. Otherwise, if no alternative access point is available, the interests will be flagged and returned to a transport layer protocol in order to explicitly notify the transport layer protocol about the mobility losses and prevent the transport layer from taking these losses for congestion.

In case of producer node mobility, the above can be extended to make in path routers in addition to consumer or user nodes aware of the mobility event and to enable a retransmission of the interests over alternative paths within the lifetime of the pending interval timer. When an access point detects that a producer (e.g., cloud services 106 or server 108) is no longer connected, the access point can look up all pending interest table entries sent to the particular producer. The access point can then try to reforward the interests to an alternative producer (if any). If no alternative produces are available, the interests can be marked with a special flag and returned back on the corresponding incoming paths. The entry can then be removed from the pending interest table.

The same procedure can be implemented when an access point cannot forward an interest. When a network node gets a flagged interest, it will check in its forwarding table (e.g., forwarding table 118a or 118b) to determine whether it has another producer to forward the particular interest. If there is one, the flag is removed and the pending interest is reforwarded to the new producer. If no other producer is available, the flagged pending interest will be forwarded to the list of incoming faces from the corresponding interest table entry and the entry is then removed. The term "face" generally refers to a network interface that includes a connection between network nodes or a connection between a network device and an application running on it. If no nodes of the path have alternative producers to reforward the flagged pending interest, the flagged pending interest will be communicated to the consumer (e.g., electronic device 102) or user node and the mobility losses can be realized. The congestion window should not be dropped on detection of the mobility losses.

Turning to the infrastructure of FIG. 1, communication system 100 in accordance with an example embodiment is shown. Generally, communication system 100 can be implemented in any type or topology of networks. Network 110 represents a series of points or nodes of interconnected communication paths for receiving and transmitting packets of information that propagate through communication system 100. Network 110 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof. Additionally, radio signal communications over a cellular network may also be provided in communication systems 100. Suitable interfaces and infrastructure may be provided to enable communication with the cellular network.

The term "packet" as used herein, refers to a unit of data that can be routed between a source node and a destination node on a packet switched network. A packet may include a source network address and a destination network address. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, access points 104a and 104b, cloud services 106, and server 108 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, electronic device 102, access points 104a and 104b, cloud services 106, and server 108 can include memory elements for storing information to be used in the operations outlined herein. Electronic device 102, access points 104a and 104b, cloud services 106, and server 108 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic device 102, access points 104a and 104b, cloud services 106, and server 108 can be configured to achieve, or to foster, operations as outlined herein. These network elements may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the network elements can be implemented as software, hardware, firmware, or any suitable combination thereof. These elements may also include software (or reciprocating software) that can coordinate with other network elements in order to achieve the operations, as outlined herein.

Additionally, electronic device 102, access points 104a and 104b, cloud services 106, and server 108 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 can be a network element and include, for example, desktop computers, laptop computers, mobile devices, personal digital assistants, smartphones, tablets, or other similar devices. Each access point 104a and 104b may be an intelligent traffic director or some other similar type device. Cloud services 106 is configured to provide cloud services to electronic device 102. Cloud services 106 may generally be defined as the use of computing resources that are delivered as a service over a network, such as the Internet. Typically, compute, storage, and network resources are offered in a cloud infrastructure, effectively shifting the workload from a local network to the cloud network. Server 108 can be a network element such as a server or virtual server and can be associated with clients, customers, endpoints, or end users wishing to initiate a communication in communication system 100 via some network (e.g., network 110). The term 'server' is inclusive of devices used to serve the requests of clients and/or perform some computational task on behalf of clients within communication system 100.

Figure 2A:
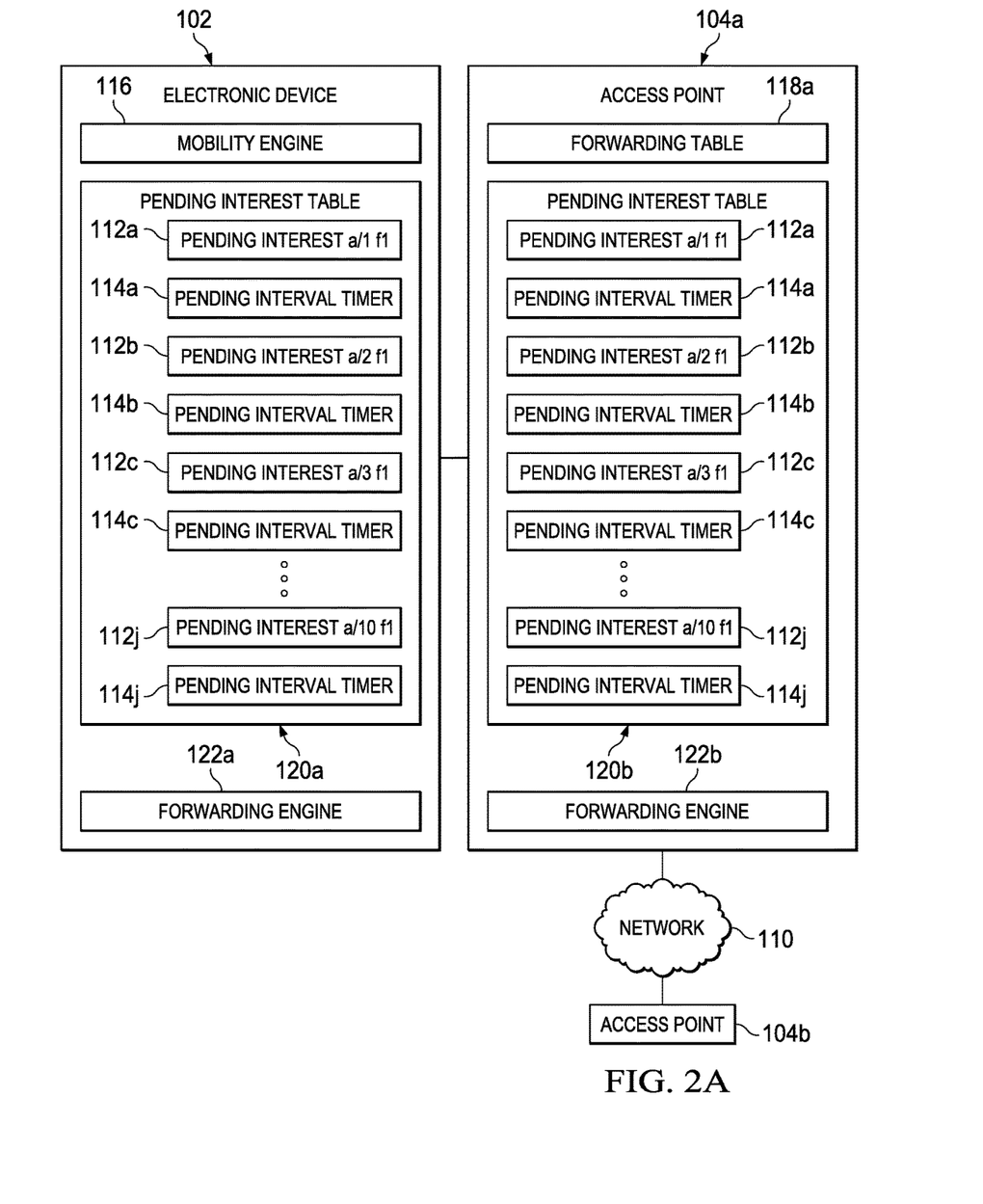
FIG. 2A is a simplified block diagram illustrating possible example details associated with the communication system in accordance with one embodiment of the present disclosure.

Turning to FIG. 2A, FIG. 2A is a simplified block diagram illustrating one possible set of details associated communication system 100. As illustrated in FIG. 2A, electronic device 102 has requested data and sent pending interests 112a-112j (or one for each data packet related to the requested data). Each pending interest 112a-112j can have a corresponding pending interval timer 114a-114j. Access point 104a is connected or coupled to electronic device and can receive each of pending interest 112a-112j. As each of the pending interests are satisfied, they can be removed from pending interest tables 120a and 120b.

Figure 2B:
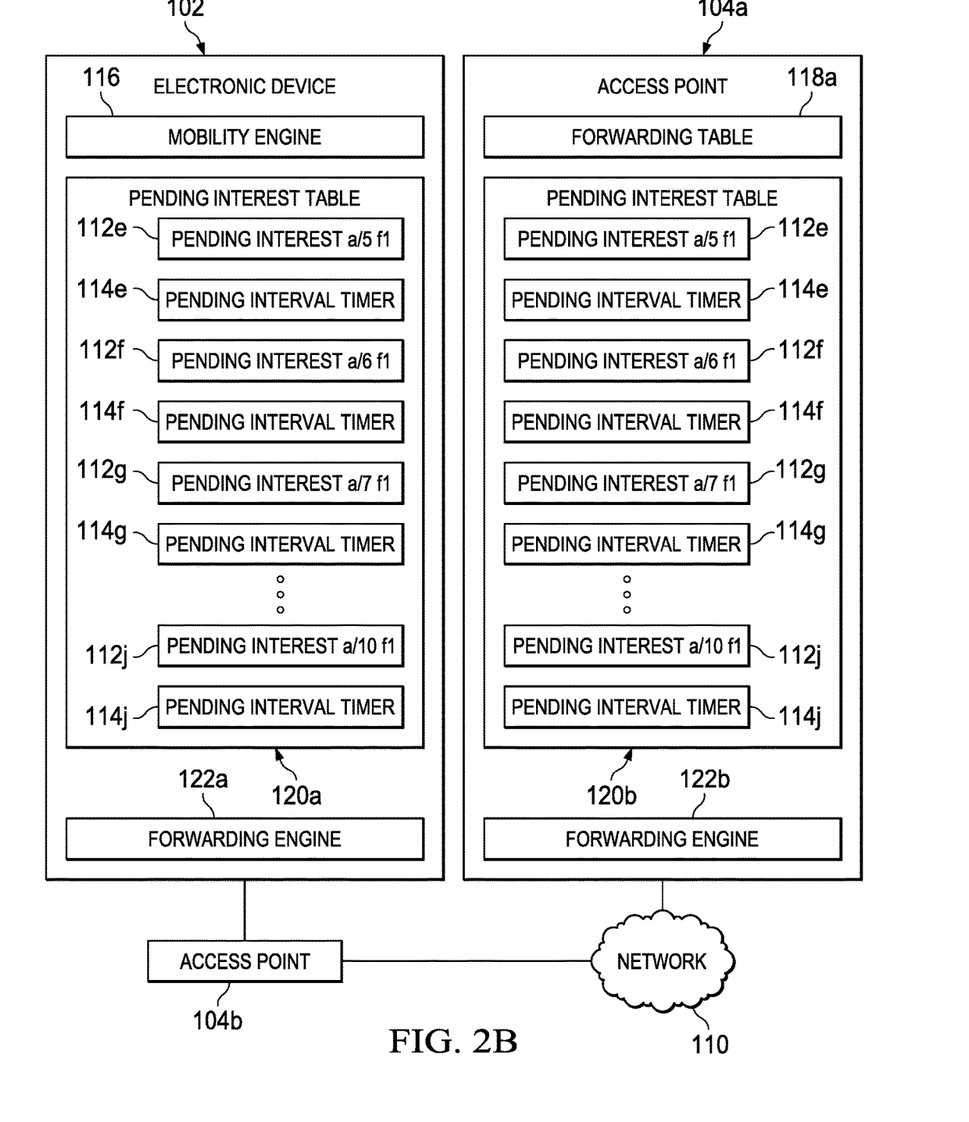
FIG. 2B is a simplified block diagram illustrating possible example details associated with the communication system in accordance with one embodiment of the present disclosure.

Turning to FIG. 2B, FIG. 2B is a simplified block diagram illustrating one possible set of details associated communication system 100. As illustrated in FIG. 2B, electronic device 102 is no longer coupled to access point 104a and is now coupled to access point 104b. Before the move, pending interests 112a-112d were satisfied and therefore have been removed from pending interest tables 120a and 120b. However, before the move, pending interest 112e-112j were not satisfied and therefore as still pending in pending interest tables 120a and 120b. In current or known systems, pending interest 112e-112j that have not yet been satisfied will never be satisfied due to the symmetric routing property. Current systems are designed such that no action is taken until a pending interval timer (e.g., pending interval timers 114e-114j) for the packet (e.g., pending interest 112e-112j respectively) expires. All kind of losses are typically detected due to the expiration of a timeout, which is set equal to the interest lifetime, in the order of seconds. This causes a retransmission of the expired packet and a congestion window decrease due to the misinterpretation of timeouts as congestion rather than mobility signals.

Communication system 100 can be configured so when electronic device 102 detects its mobility from access point 104a to access point 104b, mobility engine 116 will perform a lookup in pending interest table 120a to find all entries that have been sent to access point 104a (e.g., the previous access point). Mobility engine 116 can be configured to determine that pending interest 112e-112j had been sent to access point 104a and are still pending. Because electronic device 102 is no longer coupled to access point 104a, pending interest 112e-112j will actually never be satisfied due to symmetric routing. In the example illustrated in FIG. 2B, access point 104b is available, electronic device 102 is coupled to access point 104b, and mobility engine 116 can reforward pending interest 112e-112j to access point 104b without waiting for the corresponding pending interval time 114e-114j to expire.

Figure 3:
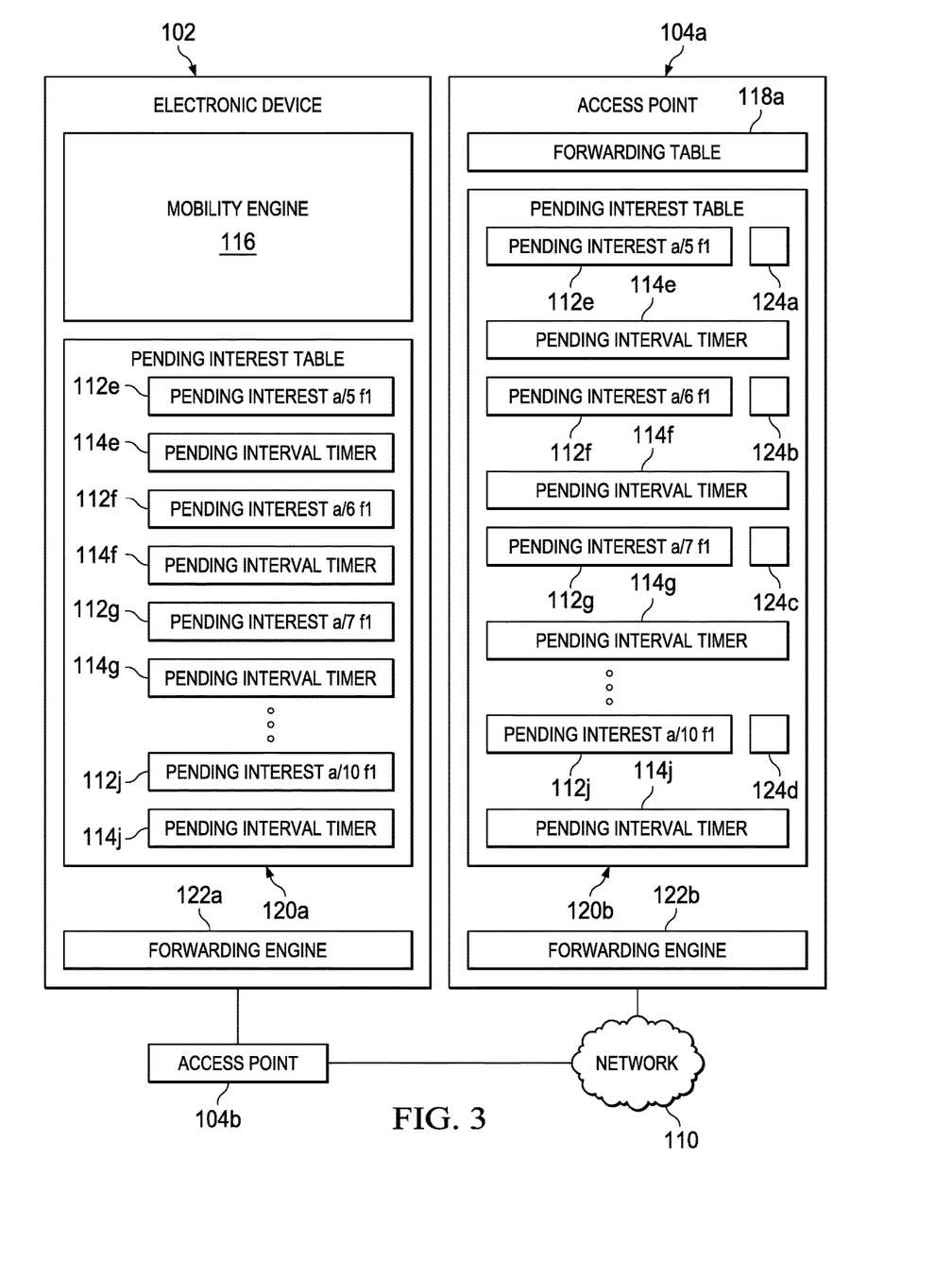
FIG. 3 is a simplified block diagram illustrating possible example details associated with the communication system in accordance with one embodiment of the present disclosure.

Turning to FIG. 3, FIG. 3 is a simplified block diagram illustrating one possible set of details associated communication system 100. As illustrated in FIG. 3, in case of producer mobility, in path routers can be used in addition to electronic device 102 being aware of the mobility event and to enable a retransmission of pending interest 112e-112j over alternative paths within the corresponding pending interval time 114e-114j before the corresponding pending interval time 114e-114j expire. When access point 104a detects that electronic device 102 (a producer in this example) is no longer connected, forwarding engine 122 can look up all the pending interest in pending interest table 120b sent to electronic device 102 (e.g., pending interest 112e-112j). Note that other pending interest will be present in pending interest table 120b but they are not illustrated for simplicity and conciseness. Forwarding engine 122 will then try to reforward pending interest 112e-112j to an alternative face (if any). If no alternative faces are available, pending interest 112e-112j will be marked with a special flag (e.g., flags 124a-124d) and returned back on the corresponding incoming faces. Pending interest 112e-112j can then be removed from pending interest table 120b.

Figure 4:
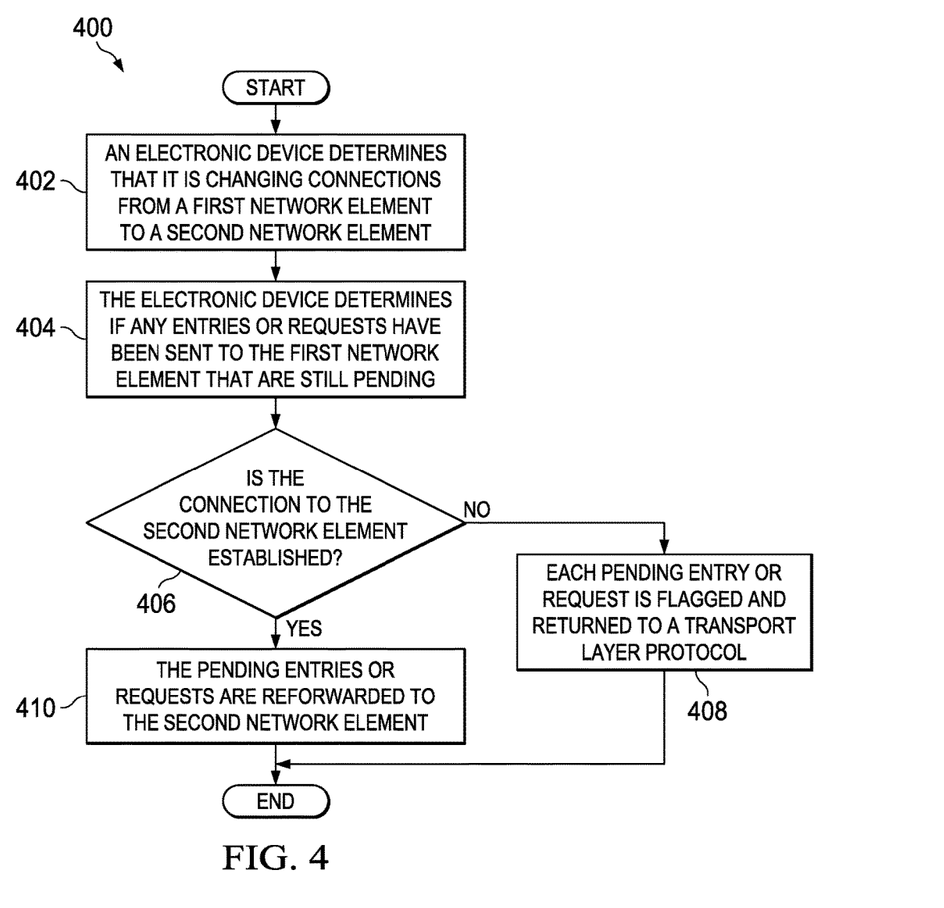
FIG. 4 is a simplified flowchart illustrating potential operations associated with the communication system.

A similar situation can occur when access point 104a cannot forward pending interest 112e-112j. When a network node receives a flagged interest, it will check in its forwarding table (e.g., forwarding table 118a) to determine whether it has another face to forward the particular pending interest. If there is another face to forward the particular pending interest, the flag (e.g., flag 124a) is removed and the interest (e.g., pending interest 112e that corresponds to flag 124a) is reforwarded to the new face. The term "new face" is to include an output face of a network device from where the system can reach the desired content. If no other face is available, the flagged interest will be forwarded to the list of incoming faces from the corresponding pending interest table entry and the entry is then removed. If no nodes of the path have an alternative face to reforward the flagged pending interest, the flagged pending interest will be communicated to electronic device 102 (e.g., a consumer or end user) and electronic device 102 can be informed about the mobility losses. The congestion window will not be dropped on detection of the mobility losses Turning to FIG. 4, FIG. 4 is a simplified flowchart 400 illustrating one potential operation associated with the present disclosure. At 402, an electronic device determines that it is changing connections from a first network element to a second network element. For example, electronic device 102 can determine it is moving or changing its connection from access point 104a to access point 104b. At 404, the electronic device determines if any entries or requests have been sent to the first network element that are still pending. For example, electronic device 102 can determine that pending interests 112e-112g are still pending. At 406, the system determines if the connection to the second network element is established. If the connection to the second network element is established, then the pending entries or requests are reforwarded to the second network element, as in 410. If the connection to the second network element is not established, then each pending entry or request is flagged and returned to a transport layer protocol, as in 408.

Figure 5:
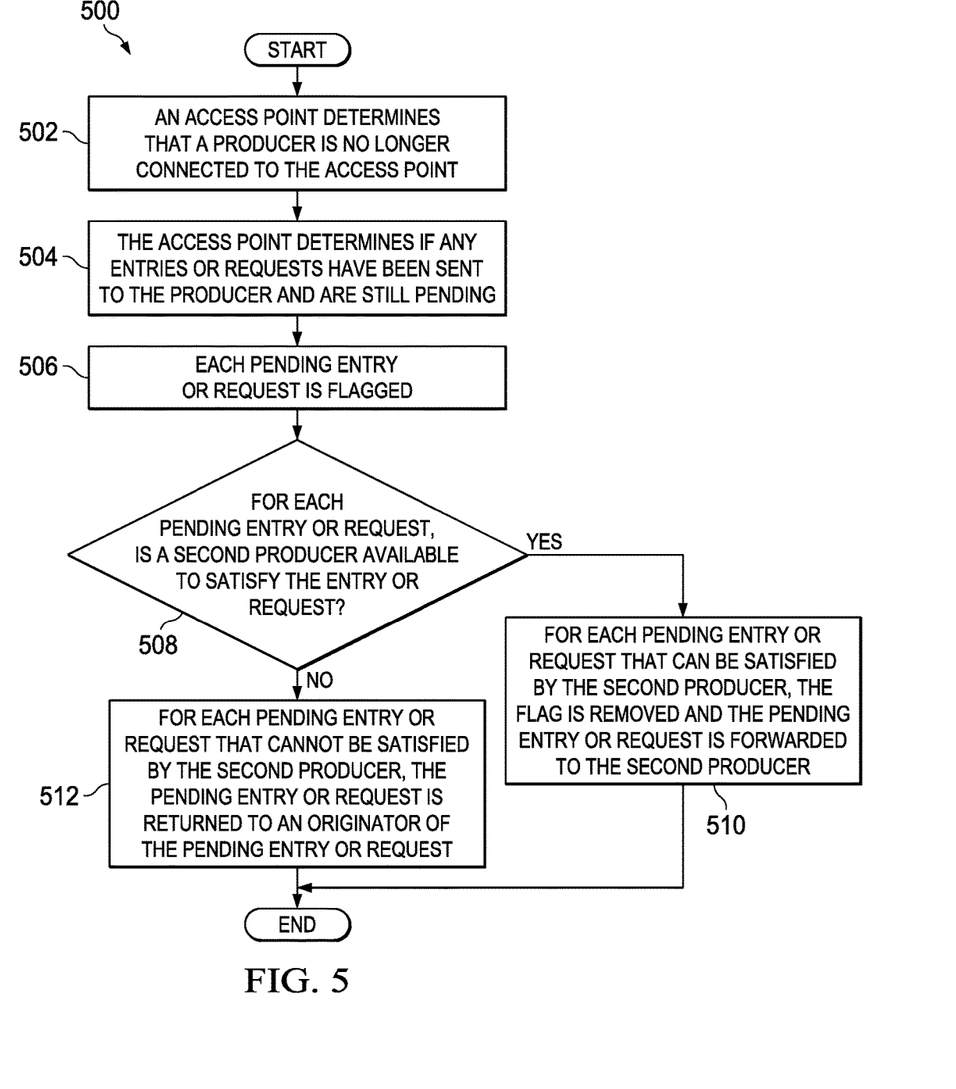
FIG. 5 is a simplified flowchart illustrating potential operations associated with the communication system.

Turning to FIG. 5, FIG. 5 is a simplified flowchart 500 illustrating one potential operation associated with the present disclosure. At 502, an access point determines that a producer is no longer connected to the access point. At 504, the access point determines if any entries or requests have been sent to the producer and are still pending. At 506, each pending entry or request is flagged. At 508, for each pending entry or request, the system determines if a second producer is available to satisfy the entry or request. If the system determines that a second producer is available to satisfy an entry or request, then for each pending entry or request that can be satisfied by the second producer, the flag is removed and the pending entry or request is forwarded to the second producer, as in 510. If the system determines that a second producer is not available to satisfy an entry or request, then for each pending entry or request that cannot be satisfied the by second producer, the pending entry or request is returned to an originator of the pending entry or request. In an example, the originator of the pending entry or request can be informed of the loss of the producer. When the pending entry or request is reforwarded or returned, it will follow a path along one or more nodes and each of the one or more nodes may be able to reroute the pending entry or request so that it is satisfied or reaches a destination that can fulfill the pending entry or request.

Note that in certain example implementations, the mobility loss detection and recovery functions outlined herein may be implemented in logic encoded in one or more non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element can store data used for the operations described herein. This includes the memory element being able to store code (e.g., software, logic, processor instructions, etc.) that can be executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagram illustrates only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, communication system 100 may be applicable to other protocols and arrangements. Along similar lines, communication system 100 can be extended to any communications involving network elements, where the present disclosure is explicitly not confined to unicasting and multicasting activities.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A computer-implemented method of mobility loss detection and recovery, the computer-implemented method comprising:

maintaining, by a client, a pending request table reflecting any pending requests sent by the client, wherein each pending request is associated with a respective, pending interval timer, wherein the client comprises a portable electronic device;

upon determining that the client is no longer connected to a first access point, determining, by the client and based on the pending request table, one or more pending requests that had been sent from the client to the first access point, wherein the one or more pending requests are serviceable by a first server; and upon determining that the client has successfully established connectivity with a second access point, forwarding, by one or more computer processors of the client, each of the one or more pending requests to the second access point without first awaiting expiration of the pending interval timer associated with the respective pending request.

2. The computer-implemented method of claim 1, wherein the one or more pending requests are part of an information centric networking (ICN) protocol.

3. The computer-implemented method of claim 1, wherein the portable electronic device is selected from a laptop computer, a mobile phone device, a personal digital assistant, and a tablet device.

4. The computer-implemented method of claim 1, wherein the first and second access points are part of a system that uses information centric networking (ICN).

5. The computer-implemented method of claim 1, wherein the first server is configured to receive the one or more pending requests via the second access point and provide, to the client, content responsive to the one or more pending requests, whereupon the client is configured to output the content and remove the one or more pending requests from the pending request table.

6. The computer-implemented method of claim 5, wherein the client is further configured to, upon determining that no access point is available for the client to connect to, flag and return the one or more pending requests to a transport layer in order to explicitly notify the transport layer of request failure in order to prevent the transport layer from: misconstruing the request failure as network congestion and taking remedial action to reduce supposed network congestion.

7. The computer-implemented method of claim 6, wherein the one or more pending requests comprises a first one or more pending requests, wherein an access point selected from the first and second access points is configured to:

determine, by the selected access point, that the first server is no longer reachable by the selected access point;

upon determining a second one or more pending requests that had been sent from the client to the selected access point and that had been serviceable by the first server, flag the second one or more pending requests; and upon determining that an alternative to the first server is reachable by the selected access point, the alternative comprising a second server, unflag and forward the second one or more pending requests to the second server without first awaiting expiration of one or more pending interval timers associated with the second one or more pending requests, whereupon the second server is configured to provide, to the client, content responsive to the second one or more pending requests, whereupon the client is configured to output the content and remove the second one or more pending requests from the pending request table.

8. The computer-implemented method of claim 7, wherein the selected access point is further configured to:

upon determining that no alternative to the first server is reachable by the selected access point, further flag and return the second one or more pending requests to the transport layer in order to explicitly notify the transport layer of request failure in order to prevent the transport layer from (i) misconstruing the request failure as network congestion and (ii) taking remedial action to reduce supposed network congestion.

9. The computer-implemented method of claim 8, wherein the selected access point is further configured to:

upon determining that no alternative to the first server is reachable by the selected access point, notify the client that no alternative to the first server is available for servicing the second one or more pending requests, whereupon the client is configured to remove the second one or more pending requests from the pending request table without first awaiting expiration of the one or more pending interval timers and without having received any content responsive to the second one or more pending requests.

10. The computer-implemented method of claim 9, wherein each remedial action includes (i) retransmitting at least one pending request only upon expiration of the at least one pending request and (ii) decreasing a congestion window;

wherein the one or more pending requests are part of an information centric networking (ICN) protocol, wherein the first and second access points are part of a system that uses ICN;

wherein due to a symmetric routing property of the ICN protocol, each pending request that has not yet been serviced will never be satisfied unless the respective pending request is resent, wherein both a perceived download time and a perceived quality of service are improved in performing each remedial action without first awaiting pending interval timer expiration;

wherein the portable electronic device is selected from a laptop computer, a mobile phone device, a personal digital assistant, and a tablet device.

11. At least one non-transitory machine readable medium comprising one or more instructions executable to perform an operation for of mobility loss detection and recovery, the operation comprising:

maintaining, by a client, a pending request table reflecting any pending requests sent by the client, wherein each pending request is associated with a respective, pending interval timer, wherein the client comprises a portable electronic device;

upon determining that the client is no longer connected to a first access point, determining, by the client and based on the pending request table, one or more pending requests that had been sent from the client to the first access point, wherein the one or more pending requests are serviceable by a first server; and upon determining that the client has successfully established connectivity with a second access point, forwarding, by one or more computer processors when executing the one or more instructions, each of the one or more pending requests to the second access point without first awaiting expiration of the pending interval timer associated with the respective pending request.

12. The at least one non-transitory machine readable medium of claim 11, wherein the one or more pending requests are part of an information centric networking (ICN) protocol.

13. The at least one non-transitory machine readable medium of claim 11, wherein the portable electronic device is selected from a laptop computer, a mobile phone device, a personal digital assistant and a tablet device.

14. The at least one non-transitory machine readable medium of claim 11, wherein the first and second access points are part of a system that uses information centric networking (ICN).

15. The at least one non-transitory machine readable medium of claim 11, wherein the first server is configured to receive the one or more pending requests via the second access point and provide, to the client, content responsive to the one or more pending requests, whereupon the client is configured to output the content and remove the one or more pending requests from the pending request table.

16. An portable electronic device of mobility loss detection and recovery, the portable electronic device comprising:
   a memory element configured to store data,
   a processor operable to execute instructions associated with the data, and
   a mobility engine configured to perform an operation comprising:
      maintaining, by the portable electronic device, a pending request table reflecting any pending requests sent by the portable electronic device, wherein each pending request is associated with a respective, pending interval timer;
      upon determining that the portable electronic device is no longer connected to a first access point had been sent from the portable electronic device to the first access point, wherein the one or more pending requests are serviceable by a first server; and
      upon determining that the portable electronic device has successfully established connectivity with a second access point, forwarding each of the one or more pending requests to the second access point without first awaiting expiration of the pending interval timer associated with the respective pending request.

17. The portable electronic device of claim 16, wherein the one or more pending interests are part of an information centric networking (ICN) protocol.

18. The portable electronic device of claim 16, wherein the first and second access points are part of a system that uses information centric networking (ICN).

19. The portable electronic device of claim 16, wherein the portable electronic device is selected from a laptop computer, a mobile phone device, a personal digital assistant, and a tablet device.

20. The portable electronic device of claim 16, wherein the first server is configured to receive the one or more pending requests via the second access point and provide, to the portable electronic device, content responsive to the one or more pending requests, whereupon the portable electronic device is configured to output the content and remove the one or more pending requests from the pending request table.

* * * * *